United States Patent
Bremer (10) Patent No.: US 8,023,580 B2
(45) Date of Patent: Sep. 20, 2011

(54) SYSTEM AND METHOD OF COMMUNICATION USING AT LEAST TWO MODULATION METHODS

(76) Inventor: Gordon F. Bremer, Clearwater, FL (US)

( * ) Notice: Subject to any disclaimer, the term of this patent is extended or adjusted under 35 U.S.C. 154(b) by 0 days.

(21) Appl. No.: 12/543,910

(22) Filed: Aug. 19, 2009

(65) Prior Publication Data

US 2010/0183055 A1   Jul. 22, 2010

Related U.S. Application Data

(63) Continuation of application No. 11/774,803, filed on Jul. 9, 2007, now Pat. No. 7,675,965, which is a continuation of application No. 10/412,878, filed on Apr. 14, 2003, now Pat. No. 7,248,626, which is a continuation-in-part of application No. 09/205,205, filed on Dec. 4, 1998, now Pat. No. 6,614,838.

(60) Provisional application No. 60/067,562, filed on Dec. 5, 1997.

(51) Int. Cl.
*H04L 5/12* (2006.01)

(52) U.S. Cl. ........ 375/261; 455/102; 332/108; 332/119; 332/151

(58) Field of Classification Search .......... 375/261, 375/269, 285, 222, 298, 302, 305, 308; 455/102, 455/110; 332/108, 119, 120, 151
See application file for complete search history.

(56) References Cited

U.S. PATENT DOCUMENTS

| | | |
|---|---|---|
| 3,736,528 A | 5/1973 | Acker et al. |
| 3,761,840 A | 9/1973 | Bremer |
| 3,970,926 A | 7/1976 | Rigby et al. |
| 4,091,422 A | 5/1978 | Amster |
| 4,335,464 A | 6/1982 | Armstrong et al. |
| 4,381,546 A | 4/1983 | Armstrong |
| 4,464,767 A | 8/1984 | Bremer |
| 4,503,545 A | 3/1985 | Bremer et al. |
| 4,509,171 A | 4/1985 | Bremer et al. |
| 4,516,216 A | 5/1985 | Armstrong |
| 4,525,846 A | 6/1985 | Bremer et al. |
| 4,525,847 A | 6/1985 | Bremer |
| 4,532,640 A | 7/1985 | Bremer et al. |
| 4,630,286 A | 12/1986 | Betts |
| 4,645,871 A | 2/1987 | Bremer et al. |
| 4,654,807 A | 3/1987 | Bremer |
| 4,663,766 A | 5/1987 | Bremer |
| 4,677,625 A | 6/1987 | Betts et al. |
| 4,782,498 A | 11/1988 | Copeland, III |

(Continued)

OTHER PUBLICATIONS

"Conelrad Emergency Radio Notification System Born in 1951", www.modestoradiomuseum.org, Accessed on Dec. 5, 2010, 2 pages.

(Continued)

*Primary Examiner* — Dac Ha
(74) *Attorney, Agent, or Firm* — Condo Roccia LLP (57) ABSTRACT

A device may be capable of communicating using at least two type types of modulation methods. The device may include a transceiver capable of acting as a master according to a master/slave relationship in which communication from a slave to a master occurs in response to communication from the master to the slave. The master transceiver may send transmissions discrete transmissions structured with a first portion and a payload portion. Information in the first portion may be modulated according to a first modulation method and indicate an impending change to a second modulation method, which is used for transmitting the payload portion. The discrete transmissions may be addressed for an intended destination of the payload portion.

79 Claims, 8 Drawing Sheets

U.S. PATENT DOCUMENTS

| | | | |
|---|---|---|---|
| 4,811,357 A | 3/1989 | Betts et al. | |
| 4,862,464 A | 8/1989 | Betts et al. | |
| 4,924,516 A | 5/1990 | Bremer et al. | |
| 4,926,448 A | 5/1990 | Kraul et al. | |
| 4,939,748 A | 7/1990 | Betts et al. | |
| 5,008,903 A | 4/1991 | Betts et al. | |
| 5,050,536 A | 9/1991 | Baker | |
| 5,081,647 A | 1/1992 | Bremer | |
| 5,099,478 A | 3/1992 | Bremer et al. | |
| 5,168,535 A | 12/1992 | Laor | |
| 5,206,854 A | 4/1993 | Betts et al. | |
| 5,230,010 A | 7/1993 | Betts et al. | |
| 5,239,306 A | 8/1993 | Siwiak et al. | |
| 5,239,607 A | 8/1993 | Da Silva et al. | |
| 5,251,236 A | 10/1993 | Brehmer et al. | |
| 5,251,328 A | 10/1993 | Shaw | |
| 5,257,396 A | 10/1993 | Auld, Jr. et al. | |
| 5,280,503 A | 1/1994 | Betts et al. | |
| 5,311,557 A | 5/1994 | Betts et al. | |
| 5,311,578 A | 5/1994 | Bremer et al. | |
| 5,345,332 A | 9/1994 | Da Silva et al. | |
| 5,355,362 A | 10/1994 | Gorshe et al. | |
| 5,373,149 A | 12/1994 | Rasmussen | |
| 5,392,154 A | 2/1995 | Chang et al. | |
| 5,412,651 A | 5/1995 | Gorshe | |
| 5,414,540 A | 5/1995 | Patel et al. | |
| 5,436,930 A | 7/1995 | Bremer et al. | |
| 5,444,704 A | 8/1995 | Henderson et al. | |
| 5,448,555 A | 9/1995 | Bremer et al. | |
| 5,473,675 A | 12/1995 | Chapman et al. | |
| 5,475,713 A | 12/1995 | Bremer et al. | |
| 5,506,866 A | 4/1996 | Bremer et al. | |
| 5,513,212 A | 4/1996 | Bremer | |
| 5,513,213 A | 4/1996 | Patel et al. | |
| 5,521,942 A | 5/1996 | Betts et al. | |
| 5,530,718 A | 6/1996 | Gradeler et al. | |
| 5,537,398 A | 7/1996 | Siwiak | |
| 5,537,411 A | 7/1996 | Plas | |
| 5,537,436 A | 7/1996 | Bottoms et al. | |
| 5,540,456 A | 7/1996 | Meier-Burkamp et al. | |
| 5,548,222 A | 8/1996 | Jensen et al. | |
| 5,550,881 A * | 8/1996 | Sridhar et al. | 375/377 |
| 5,559,791 A | 9/1996 | Bremer et al. | |
| 5,559,792 A | 9/1996 | Bottoms et al. | |
| 5,559,810 A * | 9/1996 | Gilbert et al. | 714/704 |
| 5,563,883 A | 10/1996 | Cheng | |
| 5,570,295 A | 10/1996 | Isenberg et al. | |
| 5,577,087 A | 11/1996 | Furuya | |
| 5,602,869 A | 2/1997 | Scott | |
| 5,629,992 A | 5/1997 | Amersfoort | |
| 5,642,379 A | 6/1997 | Bremer et al. | |
| 5,651,114 A | 7/1997 | Davidson, Jr. | |
| 5,661,718 A | 8/1997 | Bremer et al. | |
| 5,671,250 A | 9/1997 | Bremer et al. | |
| 5,684,825 A | 11/1997 | Ko | |
| 5,684,834 A | 11/1997 | Betts et al. | |
| 5,711,012 A | 1/1998 | Bottoms et al. | |
| 5,719,922 A | 2/1998 | Bremer et al. | |
| 5,719,923 A | 2/1998 | Bremer et al. | |
| 5,748,811 A | 5/1998 | Amersfoort et al. | |
| 5,764,699 A * | 6/1998 | Needham et al. | 375/261 |
| 5,793,800 A | 8/1998 | Jylha et al. | |
| 5,805,669 A | 9/1998 | Bingel et al. | |
| 5,805,755 A | 9/1998 | Amersfoort et al. | |
| 5,812,537 A | 9/1998 | Betts et al. | |
| 5,825,517 A | 10/1998 | Antoniades et al. | |
| 5,828,657 A | 10/1998 | Betts et al. | |
| 5,841,500 A | 11/1998 | Patel | |
| 5,844,944 A | 12/1998 | Betts et al. | |
| 5,859,877 A | 1/1999 | Betts et al. | |
| 5,881,047 A | 3/1999 | Bremer et al. | |
| 5,881,142 A | 3/1999 | Frankel et al. | |
| 5,901,205 A | 5/1999 | Smith et al. | |
| 5,915,003 A | 6/1999 | Bremer et al. | |
| 5,936,949 A | 8/1999 | Pasternak et al. | |
| 5,940,438 A * | 8/1999 | Poon et al. | 375/222 |
| 5,960,400 A | 9/1999 | Bremer | |
| 5,963,620 A | 10/1999 | Frankel et al. | |
| 5,999,563 A | 12/1999 | Polley et al. | |
| 6,011,814 A | 1/2000 | Martinez et al. | |
| 6,021,158 A | 2/2000 | Schurr et al. | |
| 6,031,897 A | 2/2000 | Bremer et al. | |
| 6,061,392 A | 5/2000 | Bremer et al. | |
| 6,067,297 A | 5/2000 | Beach | |
| 6,072,779 A | 6/2000 | Tzannes et al. | |
| 6,075,512 A | 6/2000 | Patel et al. | |
| 6,097,858 A | 8/2000 | Laor | |
| 6,097,860 A | 8/2000 | Laor | |
| 6,101,299 A | 8/2000 | Laor | |
| 6,108,347 A | 8/2000 | Holmquist | |
| 6,111,936 A | 8/2000 | Bremer | |
| 6,125,148 A * | 9/2000 | Frodigh et al. | 375/261 |
| 6,134,245 A | 10/2000 | Scarmalis | |
| 6,154,524 A | 11/2000 | Bremer | |
| 6,157,680 A | 12/2000 | Betts et al. | |
| 6,160,790 A | 12/2000 | Bremer | |
| 6,175,436 B1 | 1/2001 | Jackel | |
| 6,185,083 B1 | 2/2001 | Mathieu et al. | |
| 6,212,227 B1 | 4/2001 | Ko et al. | |
| 6,236,481 B1 | 5/2001 | Laor | |
| 6,236,717 B1 | 5/2001 | Bremer et al. | |
| 6,243,391 B1 | 6/2001 | Holmquist | |
| 6,252,644 B1 | 6/2001 | Patel | |
| 6,272,108 B1 | 8/2001 | Chapman | |
| 6,272,154 B1 | 8/2001 | Bala et al. | |
| 6,292,281 B1 | 9/2001 | Bala et al. | |
| 6,307,653 B1 | 10/2001 | Bala et al. | |
| 6,307,893 B1 | 10/2001 | Bremer et al. | |
| 6,307,923 B1 | 10/2001 | Bremer et al. | |
| 6,320,879 B1 | 11/2001 | Bremer | |
| 6,320,993 B1 | 11/2001 | Laor | |
| 6,330,275 B1 | 12/2001 | Bremer | |
| 6,335,992 B1 | 1/2002 | Bala et al. | |
| 6,347,008 B1 | 2/2002 | Vodhanel | |
| 6,348,986 B1 | 2/2002 | Doucet et al. | |
| 6,408,056 B1 | 6/2002 | Bremer et al. | |
| 6,445,733 B1 | 9/2002 | Zuranski et al. | |
| 6,470,110 B1 | 10/2002 | Lin | |
| 6,480,645 B1 | 11/2002 | Peale et al. | |
| 6,493,475 B1 | 12/2002 | Lin | |
| 6,529,652 B1 | 3/2003 | Bremer | |
| 6,535,589 B1 | 3/2003 | Nauman et al. | |
| 6,546,090 B1 | 4/2003 | Bremer et al. | |
| 6,549,692 B1 | 4/2003 | Harel et al. | |
| 6,556,540 B1 | 4/2003 | Mawhinney et al. | |
| 6,580,709 B1 | 6/2003 | Gorshe et al. | |
| 6,580,785 B2 | 6/2003 | Bremer et al. | |
| 6,591,029 B1 | 7/2003 | Lin et al. | |
| 6,597,827 B1 | 7/2003 | Bremer et al. | |
| 6,603,894 B1 | 8/2003 | Pu | |
| 6,614,838 B1 | 9/2003 | Bremer | |
| 6,628,857 B1 | 9/2003 | Bonadeo et al. | |
| 6,631,119 B1 | 10/2003 | Mawhinney et al. | |
| 6,633,693 B1 | 10/2003 | Peale et al. | |
| 6,647,058 B1 | 11/2003 | Bremer et al. | |
| 6,658,096 B2 | 12/2003 | Bremer et al. | |
| 6,671,328 B1 | 12/2003 | Poon et al. | |
| 6,690,644 B1 | 2/2004 | Gorshe | |
| 6,690,849 B1 | 2/2004 | Dadap, Jr. et al. | |
| 6,715,124 B1 | 3/2004 | Betts | |
| 6,744,883 B1 | 6/2004 | Bingel et al. | |
| 6,771,740 B1 | 8/2004 | Bingel | |
| 6,775,355 B1 | 8/2004 | Bingel et al. | |
| 6,782,094 B1 | 8/2004 | Venz et al. | |
| 6,782,096 B1 | 8/2004 | Bremer et al. | |
| 6,885,730 B1 | 4/2005 | Bremer | |
| 6,922,415 B1 | 7/2005 | Bremer et al. | |
| 6,950,444 B1 | 9/2005 | Holmquist et al. | |
| 6,970,501 B1 | 11/2005 | Bremer et al. | |
| 7,006,445 B1 | 2/2006 | Cole et al. | |
| 7,013,421 B2 | 3/2006 | Betts | |
| 7,020,266 B2 | 3/2006 | Bremer et al. | |
| 7,023,829 B1 | 4/2006 | Holmquist et al. | |
| 7,035,380 B1 | 4/2006 | Bingel et al. | |
| 7,046,798 B2 | 5/2006 | Betts et al. | |
| 7,058,833 B1 | 6/2006 | Bremer et al. | |
| 7,065,205 B1 | 6/2006 | Bingel et al. | |

| | | |
|---|---|---|
| 7,127,048 B2 | 10/2006 | Bremer et al. |
| 7,130,338 B2 | 10/2006 | Bremer et al. |
| 7,155,016 B1 | 12/2006 | Betts et al. |
| 7,170,867 B2 | 1/2007 | O'Toole et al. |
| 7,248,626 B2 | 7/2007 | Bremer |
| 7,272,215 B2 | 9/2007 | Bremer et al. |
| 7,289,604 B2 | 10/2007 | Bremer |
| 7,289,610 B2 | 10/2007 | Bremer et al. |
| 7,352,803 B2 | 4/2008 | Bremer et al. |
| 7,471,777 B2 | 12/2008 | Bremer et al. |
| 7,675,965 B2 | 3/2010 | Bremer |
| 7,707,446 B2 | 4/2010 | Bremer et al. |
| 7,711,109 B2 | 5/2010 | Betts et al. |
| 7,747,000 B2 | 6/2010 | Bremer et al. |
| 2001/0022836 A1 | 9/2001 | Bremer et al. |
| 2002/0041662 A1 | 4/2002 | Bremer et al. |
| 2002/0167949 A1 | 11/2002 | Bremer et al. |
| 2003/0039348 A1 | 2/2003 | Bremer et al. |
| 2003/0210773 A1 | 11/2003 | Bremer et al. |
| 2003/0210779 A1 | 11/2003 | Bremer et al. |
| 2004/0013183 A1 | 1/2004 | Bremer |
| 2004/0042510 A1 | 3/2004 | Bremer et al. |
| 2004/0052361 A1 | 3/2004 | Betts et al. |
| 2004/0066929 A1 | 4/2004 | Bremer et al. |
| 2004/0081233 A1 | 4/2004 | Bremer et al. |
| 2004/0179662 A1 | 9/2004 | Bremer et al. |
| 2004/0213170 A1 | 10/2004 | Bremer et al. |
| 2004/0258236 A1 | 12/2004 | Bremer et al. |
| 2005/0025153 A1 | 2/2005 | Bremer et al. |
| 2005/0074057 A1 | 4/2005 | Bremer et al. |
| 2005/0147158 A1 | 7/2005 | Bremer et al. |
| 2005/0152404 A1 | 7/2005 | Holmquist et al. |
| 2005/0163303 A1 | 7/2005 | Bremer |
| 2005/0180545 A1 | 8/2005 | Bremer et al. |
| 2006/0188088 A1 | 8/2006 | Bingel et al. |
| 2006/0193465 A1 | 8/2006 | Betts |
| 2006/0195712 A1 | 8/2006 | Bremer et al. |
| 2007/0047730 A1 | 3/2007 | Bremer |
| 2007/0047733 A1 | 3/2007 | Bremer |
| 2007/0286187 A1 | 12/2007 | Bremer |
| 2008/0013608 A1 | 1/2008 | Bremer |
| 2008/0019432 A1 | 1/2008 | Bremer et al. |
| 2009/0111422 A1 | 4/2009 | Bremer |
| 2009/0262911 A1 | 10/2009 | Bremer |
| 2009/0262912 A1 | 10/2009 | Bremer |
| 2010/0183055 A1 | 7/2010 | Bremer |
| 2010/0246598 A1 | 9/2010 | Bremer |

OTHER PUBLICATIONS

"Emergency Alert System", Public Safety and Homeland Security Bureau, www.fcc.gov/pshs/services/eas, Accessed on Dec. 5, 2010, 2 pages.

"Specialized Communications Techniques for the Radio Amateur", The American Radio Relay League, Inc., 1975, 1$^{st}$ Edition, Chapter 4, 78-83.

"Specialized Communications Techniques for the Radio Amateur", The American Radio Relay League, Inc., 1975, 1$^{st}$ Edition, Chapter 5, 99-113.

Bates (Ed.), "Broadband Telecommunications Handbook", McGraw-Hill Publishing, NY, 2000, Chapter 9, 128, 129, 131, 132, 133 and 134.

Benson (Ed.), "Television Engineering Handbook", McGraw-Hill Publishers, NY, 1992, 5 pages, 4.14, 4.15, 4.24, 4.34 and 4.35.

Bluetooth®, "Specification of the Bluetooth System, Master Table of Contents & Compliance Requirements", Specification vol. 0, Nov. 4, 2004, V2.0, 1-1230.

Bluetooth™, "Specification of the Bluetooth System, Core", Dec. 1, 1999, V1.0B, 1-1082.

Bluetooth™M, "Specification of the Bluetooth System, Profiles", Specification vol. 2, Dec. 1, 1999, V1.0B, 1-440.

Chorafas (Ed.), "Telephony: Today and Tomorrow", Prentice-Hall, Inc., NJ, Chapter 15, 1984, 191-197.

Erickson (Ed.), "Options for Presentation of Multilingual Text: Use of the Unicode Standard", Mar. 14, 1997, 20 pages.

Freeman (Ed.), "Telecommunications Systems Engineering: Analog and Digital Network Design", John Wiley and Sons, Inc., NY, 1980, 1 page, 180.

Goodman (Ed.), "Radio Amateur's Handbook", The American Radio Relay League, Inc., CN, 1965, Chapter 10, 291-295.

Green (Ed.), "RTTY Handbook", Tab Books, Chapter 4, 1972, 266-273.

IEEE Information Technology, "Wireless LAN Medium Access Control (MAC) and Physical Layer (PHY) Specifications", 1997, 1-466.

Jurgen (Ed.), "Digital Consumer Electronics Handbook", McGraw-Hill Publications, NY, 1997, 27.7-27.10.

Kuecken (Ed.), "Talking Computers and Telecommunications", Van Nostrand Reinhold Company, Inc., NY, 1983, 32-36.

Margulies (Ed.), "SCSA Book", Telecom Library, Inc., NJ, Chapter 8, 1993, 250.

Martin (Ed.), "Telecommunications and The Computer", Prentice-Hall, Inc., NJ, 2$^{nd}$ Edition, Chapter 21, 1976, 410-423.

Mazda, (Ed.), "Electronics Engineer's Reference Book", 5$^{th}$ Edition, Butterworth and Company Publishers, London, 1983, 54.5-54.8.

Newton (Ed.), "Newton's Telecom Dictionary", Flatiron Publications, Inc., NY, Apr. 1994, 7$^{th}$ Edition, 9, 363, 364, 426, 427, 428, 429 and 430.

Pallott and Miller, "Implementing Message Priority Polices Over an 802.11 Based Mobile Ad Hoc Network", IEEE, Military Communications Conference, 2001, MILCOM 2001, Communications for Network-Centric Operations: Creating the Information Force, Oct. 28-31, 2001, 2, 860-864.

The National Association for Amateur Radio (ARRL), Radioteletype (RTTY), "Basic Principles and Machines", Chapter 2.1, Book or Journal Title Unknown, Date Unknown, pp. 13 and 14.

The National Association for Amateur Radio (ARRL), Radioteletype (RTTY), "Autostart", Chapter 3.4, "references", Chapter 8, Book or Journal Title Unknown, Date Unknown, pp. 107-111, 183, 185, 186 and 187.

Rzeszewski (Ed.), "Color Television", IEEE Press, John Wiley and Sons, Inc, NY, 1983, 3, 8 and 9.

Shrader (Ed.), "Electronic Communication", 1959, McGraw-Hill Publishers, NY, 551-555.

Shrader (Ed.), "Electronic Communication", 1959, McGraw-Hill Publishers, NY, 519.

Third Generation Partnership Project (3GPP)—Technologies Web Page, http://www.3gpp.org/-technologies-, Accessed on Feb. 8, 2011, 2 pages.

Vilips (Ed.), "Data Modem: Selection and Evaluation Guide", Artech House, Inc, MA, Section 1, 1972, 3 pages.

Wilson et al (Ed.), "The ARRL Handbook for Radio Communications", 64$^{th}$ Edition, The American Radio Relay League, Inc., Chapter 19, 1986, 19-9-19-13.

Wilson et al. (Ed.), "The ARRL Handbook for Radio Communications", 85$^{th}$ Edition, The American Radio Relay League, Chapter 9, 2008, 9.32, 9.33 and 9.34.

Wilson et al. (Ed.), "The ARRL Handbook for Radio Communications", 64$^{th}$ Edition, The American Radio Relay League Inc., Chapter 14, 1986, 14-13 and 14-14.

International Telecommunications Union, Telecommunication Standardization Sector of ITU (ITU-T), Series T: Terminal Equipments and Protocols for Telematic Services, "Procedures for Document Facsimile Transmission in the General Switched Telephone Network", ITU-T Recommendation T.30, Jul. 1996, 176 pages.

International Telecommunications Union, The International Telegraph and Telephone Consultative Committee (CCITT), Data Communication Over The Telephone Network, "A 2-Wire Modem for Facsimile Applications with Rates Up to 14 400 bit/s", Recommendation V.17, Feb. 1991, 13 pages.

International Telecommunications Union, Telecommunication Standardization Sector of ITU (ITU-T), Series T: Terminal Equipments and Protocols for Telematic Services, "Standardization of Group 3 Facsimile Terminals for Document Transmission", ITU-T Recommendation T.4, Jul. 1996, 60 pages.

International Telecommunications Union, Telecommunication Standardization Sector of ITU (ITU-T), Series T: Terminal for Telematic

Services, "Standardization of Group 3 Facsimile Terminals for Document Transmission", ITU-T Recommendation T.4—Amendment 1, Jul. 1997, 10 pages.

International Telecommunications Union, Telecommunication Standardization Sector of ITU (ITU-T), Series T: Terminals for Telematic Services, "Standardization of Group 3 Facsimile Terminals for Document Transmission", ITU-T Recommendation T.4—Amendment 2, Oct. 1997, 14 pages.

International Telecommunications Union, Telecommunication Standardization Sector of ITU (ITU-T), Series T: Terminals for Telematic Services, "Procedures for Document Facsimile Transmission in the General Switched Telephone Network", ITU-T Recommendation T.30—Amendment 1, Jul. 1997, 110 pages.

International Telecommunications Union, Telecommunication Standardization Sector of ITU (ITU-T), Series T: Terminals for Telematic Services, "Procedures for Document Facsimile Transmission in the General Switched Telephone Network", ITU-T Recommendation T.30—Amendment 2, Oct. 1997, 18 pages.

* cited by examiner

SYSTEM AND METHOD OF COMMUNICATION USING AT LEAST TWO MODULATION METHODS

CROSS REFERENCE TO RELATED APPLICATION

This application is a continuation of U.S. application Ser. No. 11/774,803, filed on Jul. 9, 2007, which is a continuation of U.S. application Ser. No. 10/412,878, filed Apr. 14, 2003, which is a continuation-in-part of U.S. application Ser. No. 09/205,205, filed Dec. 4, 1998, and which claims priority to and the benefit of the filing date of U.S. Provisional Application No. 60/067,562, filed Dec. 5, 1997, each of which is incorporated by reference herein.

TECHNICAL FIELD

The present invention relates generally to the fields of data communications and modulator/demodulators (modems), and, more particularly, to a data communications system in which a plurality of modulation methods are used to facilitate communication among a plurality of modem types.

BACKGROUND

In existing data communications systems, a transmitter and receiver modem pair can successfully communicate only when the modems are compatible at the physical layer. That is, the modems must use compatible modulation methods. This requirement is generally true regardless of the network topology. For example, point-to-point, dial-up modems operate in either the industry standard V.34 mode or the industry standard V.22 mode. Similarly, in a multipoint architecture, all modems operate, for example, in the industry standard V.27bis mode. While the modems may be capable of using several different modulation methods, a single common modulation is negotiated at the beginning of a data session to be used throughout the duration of the session. Should it become necessary to change modulation methods, the existing data session is torn down, and a new session is negotiated using the new modulation method. Clearly, tearing down an existing data session causes a significant disruption in communication between the two modems.

As discussed in the foregoing, communication between modems is generally unsuccessful unless a common modulation method is used. In a point-to-point network architecture, if a modem attempts to establish a communication session with an incompatible modem, one or both of the modems will make several attempts to establish the communication link until giving up after a timeout period has expired or the maximum number of retry attempts has been reached. Essentially, communication on the link is impossible without replacing one of the modems such that the resulting modem pair uses a common modulation method.

In a multipoint architecture, a single central, or "master," modem communicates with two or more tributary or "trib" modems using a single modulation method. If one or more of the trib modems are not compatible with the modulation method used by the master, those tribs will be unable to receive communications from the master. Moreover, repeated attempts by the master to communicate with the incompatible trib(s) will disturb communications with compatible trib(s) due to time wasted in making the futile communication attempts.

Thus, communication systems comprised of both high performance and low or moderate performance applications can be very cost inefficient to construct. For example, some applications (e.g., internet access) require high performance modulation, such as quadrature amplitude modulation (QAM), carrier amplitude and phase (CAP) modulation, or discrete multitone (DMT) modulation, while other applications (e.g., power monitoring and control) require only modest data rates and therefore a low performance modulation method. All users in the system will generally have to be equipped with a high performance modem to ensure modulation compatibility. These state of the art modems are then run at their lowest data rates for those applications that require relatively low data throughput performance. The replacement of inexpensive modems with much more expensive state of the art devices due to modulation compatibility imposes a substantial cost that is unnecessary in terms of the service and performance to be delivered to the end user.

Accordingly, what is sought, and what is not believed to be provided by the prior art, is a system and method of communication in which multiple modulation methods are used to facilitate communication among a plurality of modems in a network, which have heretofore been incompatible.

SUMMARY

The present invention disclosed herein includes communication systems, devices, and methods. For example, a device may be capable of communicating according to a master/slave relationship in which a communication from a slave to a master occurs in response to a communication from the master to the slave. The device may include a transceiver in the role of the master for sending transmissions modulated using at least two types of modulation methods, for example a first modulation method and a second modulation method. The first modulation method may be of a different type than the second modulation method. The transmissions may be groups of transmission sequences. A group may be structured with a first portion and a payload portion. First information in the first portion may indicate which of the first modulation method or the second modulation method is used for modulating second information in the payload portion. The transmissions may be addressed for an intended destination of the payload portion. First information in a transmission that includes an address for an intended destination may include a first sequence in the first portion that is modulated according to the first modulation method and that indicates an impending change from the first modulation method to the second modulation method. Second information in a transmission that includes an address for an intended destination may include a second sequence in the payload portion that is modulated according to the second modulation method. The second sequence may be transmitted after the first sequence.

The present invention has many advantages, a few of which are delineated hereafter as merely examples.

One advantage of the present invention is that it provides to the use of a plurality of modem modulation methods on the same communication medium.

Another advantage of the present invention is that a master transceiver can communicate seamlessly with tributary transceivers or modems using incompatible modulation methods.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The present invention can be better understood with reference to the following drawings. The components and representations in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF ILLUSTRATIVE EMBODIMENTS

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Figure 1:
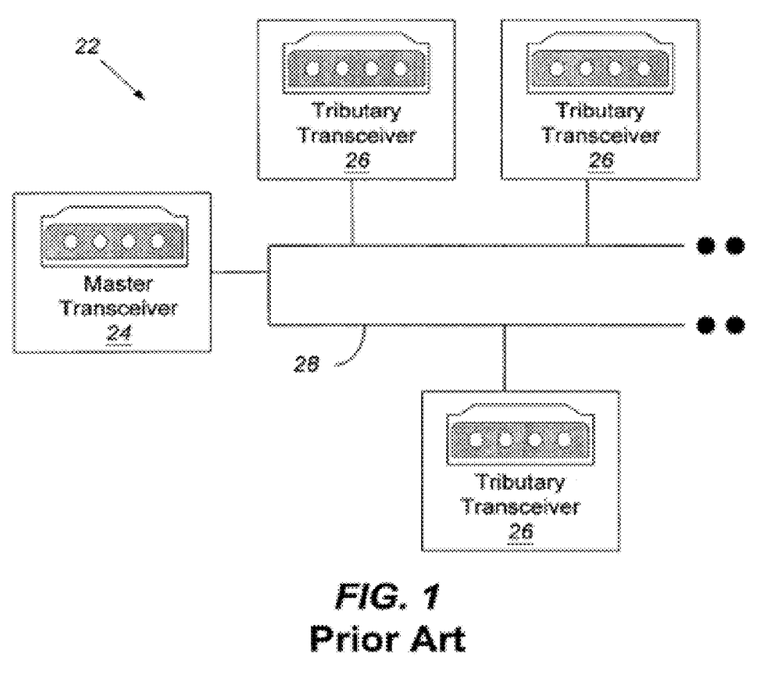
FIG. 1 is a block diagram of a prior art multipoint communication system including a master transceiver and a plurality of tributary transceivers.

With reference to FIG. 1, a prior art multipoint communication system 22 is shown to comprise a master modem or transceiver 24, which communicates with a plurality of tributary modems (tribs) or transceivers 26-26 over communication medium 28. Note that all tribs 26-26 are identical in that they share a common modulation method with the master transceiver 24. Thus, before any communication can begin in multipoint system 22, the master transceiver and the tribs 26-26 must agree on a common modulation method. If a common modulation method is found, the master transceiver 24 and a single trib 26 will then exchange sequences of signals that are particular subsets of all signals that can be communicated via the agreed upon common modulation method. These sequences are commonly referred to as training signals and can be used for the following purposes: 1) to confirm that the common modulation method is available, 2) to establish received signal level compensation, 3) to establish time recovery and/or carrier recovery, 4) to permit channel equalization and/or echo cancellation, 5) to exchange parameters for optimizing performance and/or to select optional features, and 6) to confirm agreement with regard to the foregoing purposes prior to entering into data communication mode between the users. In a multipoint system, the address of the trib with which the master is establishing communication is also transmitted during the training interval. At the end of a data session a communicating pair of modems will typically exchange a sequence of signals known as trailing signals for the purpose of reliably stopping the session and confirming that the session has been stopped. In a multipoint system, failure to detect the end of a session will delay or disrupt a subsequent session.

Figure 2:
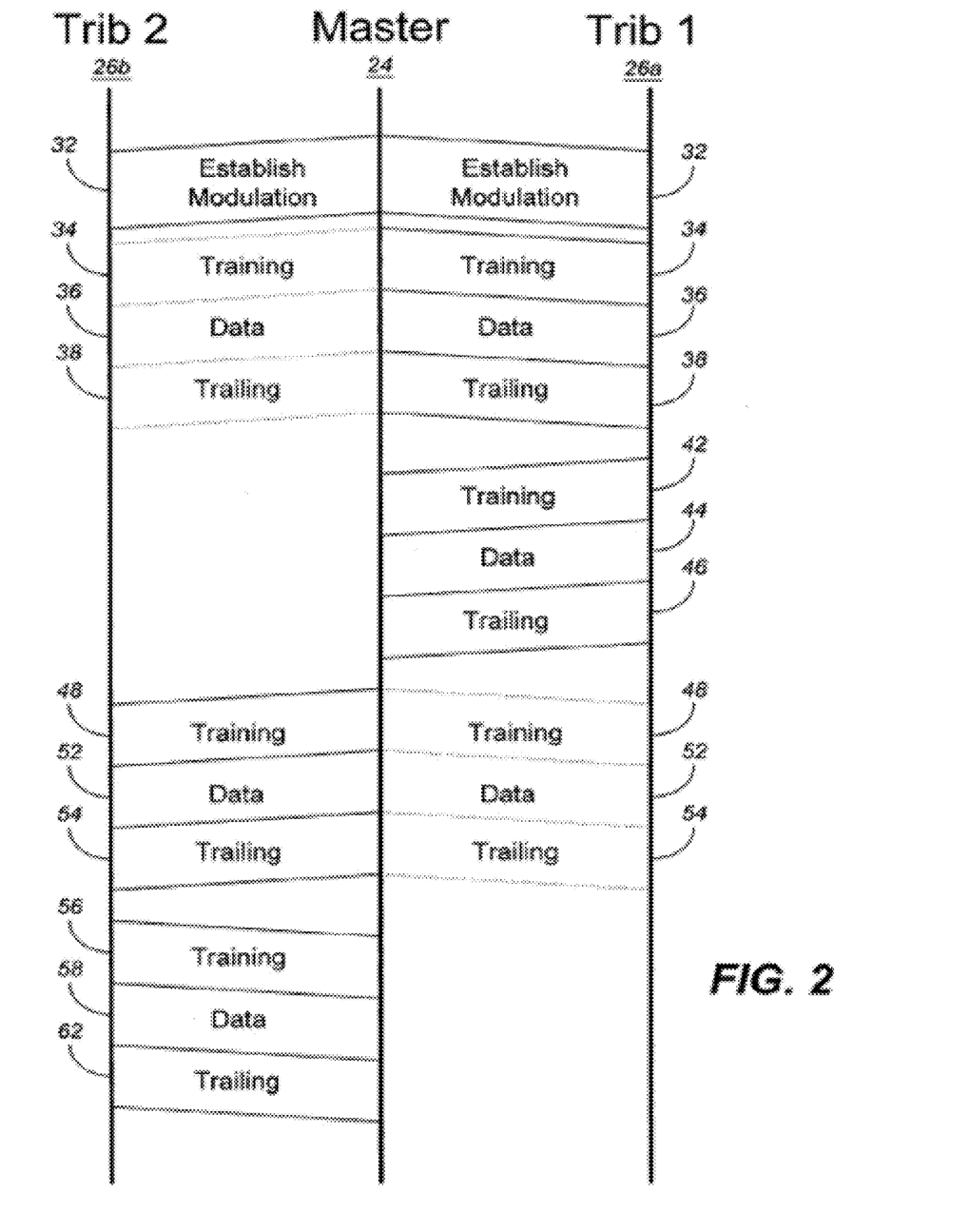
FIG. 2 is a ladder diagram illustrating the operation of the multipoint communication system of FIG. 1.
Figure 8:
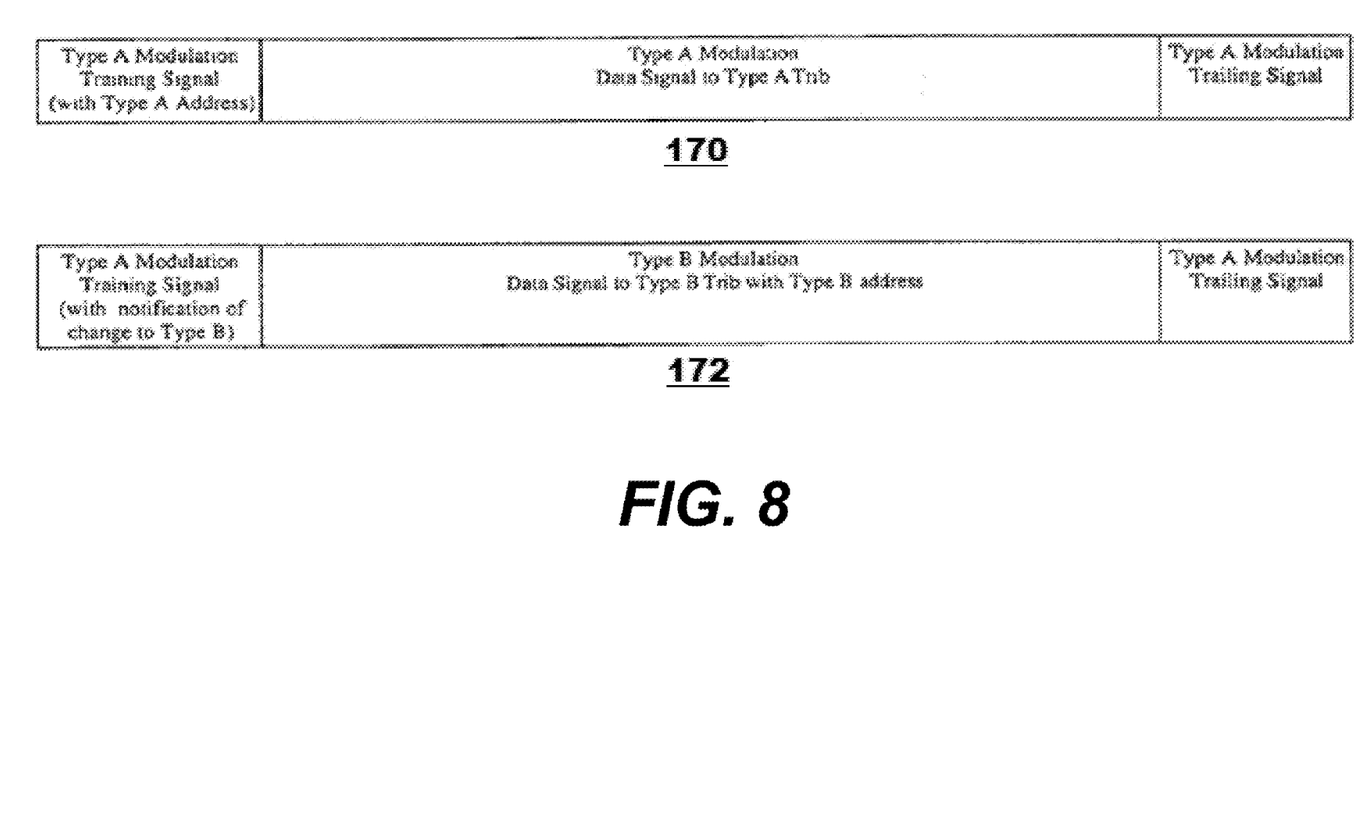
FIG. 8 is a signal diagram for an exemplary transmission according to an embodiment.

Referring now to FIG. 2, an exemplary multipoint communication session is illustrated through use of a ladder diagram. This system uses polled multipoint communication protocol. That is, a master controls the initiation of its own transmission to the tribs and permits transmission from a trib only when that trib has been selected. At the beginning of the session, the master transceiver 24 establishes a common modulation as indicated by sequence 32 that is used by both the master 24 and the tribs 26a, 26b for communication. Once the modulation scheme is established among the modems in the multipoint system, The master transceiver 24 transmits a training sequence 34 that includes the address of the trib that the master seeks to communicate with. In this case, the training sequence 34 includes the address of trib 26a. As a result, trib 26b ignores training sequence 34. After completion of the training sequence 34, master transceiver 24 transmits data 36 to trib 26a followed by trailing sequence 38, which signifies the end of the communication session. Similarly, with reference to FIG. 8, the sequence 170 illustrates a Type A modulation training signal, followed by a Type A modulation data signal. Note that trib 26b ignores data 36 and trailing sequence 38 as it was not requested for communication during training sequence 34.

At the end of trailing sequence 38, trib 26a transmits training sequence 42 to initiate a communication session with master transceiver 24. Because master transceiver 24 selected trib 26a for communication as part of training sequence 34, trib 26a is the only modem that will return a transmission. Thus, trib 26a transmits data 44 destined for master transceiver 24 followed by trailing sequence 46 to terminate the communication session.

The foregoing procedure is repeated except master transceiver identifies trib 26b in training sequence 48. In this case, trib 26a ignores the training sequence 48 and the subsequent transmission of data 52 and trailing sequence 54 because it does not recognize its address in training sequence 48. Master transceiver 24 transmits data 52 to trib 26b followed by trailing sequence 54 to terminate the communication session. Similarly, with reference to FIG. 8, sequence 172 illustrates a Type A modulation signal, with notification of a changes to Type B, followed by a Type B modulation data signal. To send information back to master transceiver 24, trib 26b transmits training sequence 56 to establish a communication session. Master transceiver 24 is conditioned to expect data only from trib 26b because trib 26b was selected as part of training sequence 48. Trib 26b transmits data 58 to master transceiver 24 terminated by trailing sequence 62.

The foregoing discussion is based on a two-wire, half-duplex multipoint system. Nevertheless, it should be understood that the concept is equally applicable to four-wire systems.

Consider the circumstance in which master transceiver 24 and trib 26b share a common modulation type A while trib 26a uses a second modulation type B. When master transceiver attempts to establish A as a common modulation during sequence 32, trib 26a will not be able to understand that communication. Moreover, trib 26a will not recognize its own address during training interval 34 and will therefore ignore data 36 and trailing sequence 38. Master transceiver 24 may time out waiting for a response from trib 26a because trib 26a will never transmit training sequence 42, data 44, and trailing sequence 46 due to the failure of trib 26a to recognize the communication request (training sequence 34) from master transceiver 24. Thus, if the tribs in a multipoint communication system use a plurality of modulation methods, the overall communication efficiency will be disrupted as specific tribs will be unable to decipher certain transmissions from the master transceiver and any unilateral transmission by a trib that has not been addressed by the master transceiver will violate the multipoint protocol.

As discussed hereinbefore, however, it is desirable to design a multipoint communication system comprising tribs that use a plurality of modulation methods. For example, one moderately priced trib may be used to communicate at a relatively high data rate for some applications, such as Internet access, while another, lower priced, trib is used to communicate at a lower data rate for other applications, such as power monitoring and control. The needs of these different applications cannot be efficiently met by a single modulation. While it is possible to use high performance tribs running state of the art modulation methods such as QAM, CAP, or DMT to implement both the high and low data rate applications, significant cost savings can be achieved if lower cost tribs using low performance modulation methods are used to implement the lower data rate applications.

Figure 3:
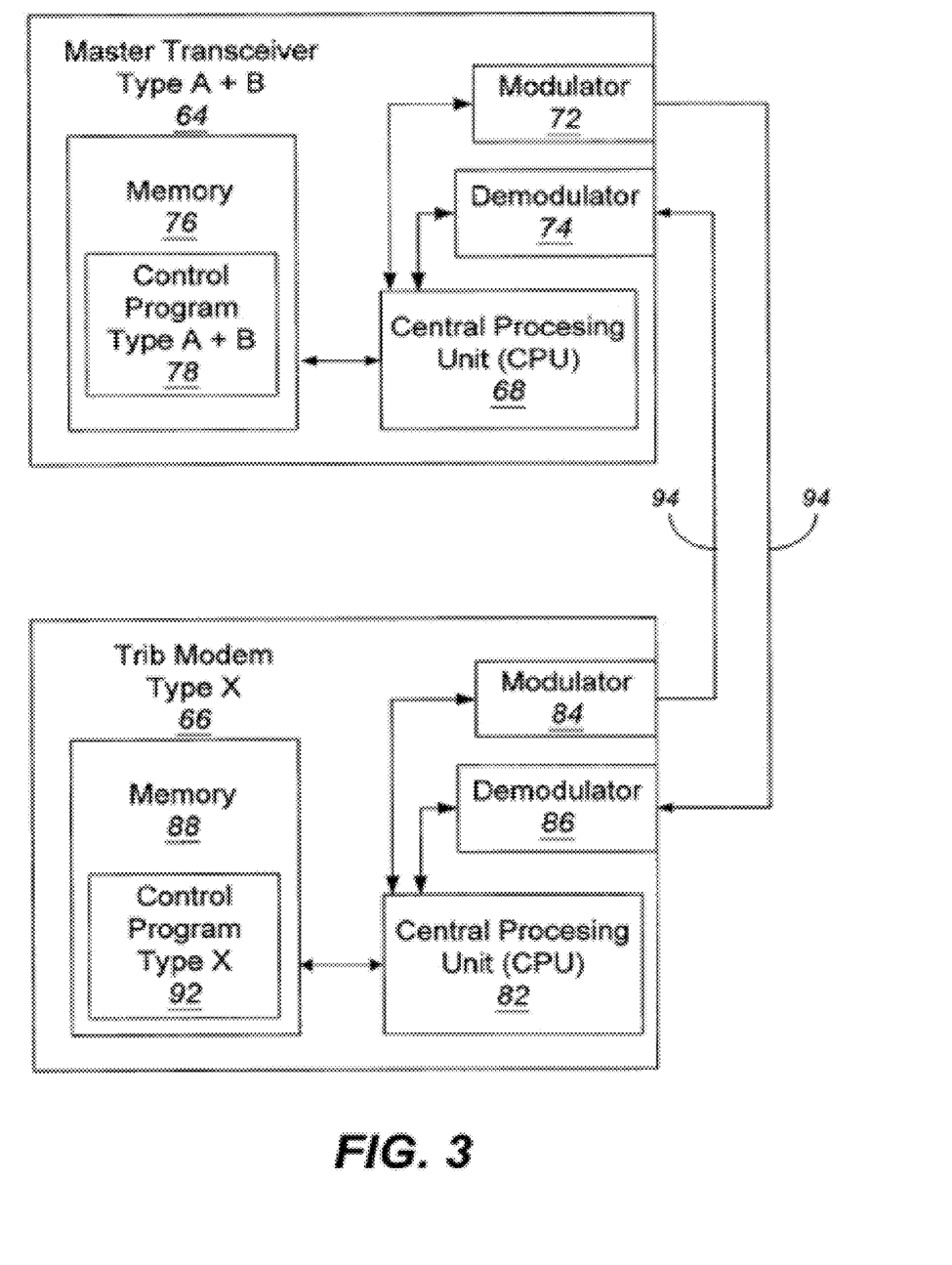
FIG. 3 is a block diagram of a master transceiver and tributary transceiver for use in the multipoint communication system of FIG. 1 in accordance with the principles of the present invention.

A block diagram of a master transceiver 64 in communication with a trib 66 in accordance with the principles of the present invention is shown in FIG. 3. Master transceiver 64 comprises a central processing unit (CPU) 68 in communication with modulator 72, demodulator 74, and memory 76. Memory 76 holds software control program 78 and any data necessary for the operation of master transceiver 64. Control program 78 includes logic for implementing a plurality of modulation methods. For purposes of illustration, control program 78 can implement both a type A and a type B modulation through modulator 72 and demodulator 74.

Trib 66 comprises CPU 82 in communication with modulator 84, demodulator 86, and memory 88. Memory 88, likewise holds software control program 92 and any data necessary for the operation of trib 66. Control programs 78 and 92, are executed by CPUs 68 and 82 and provide the control logic for the processes to be discussed herein. Control program 92 includes logic for implementing a particular modulation method, which, for purposes of illustration, is called type X Inasmuch as master transceiver 64 is capable of running either a type A or a type B modulation method, type X refers to one of those two modulation methods. The master transceiver 64 communicates with trib 66 over communication medium 94.

Figure 4:
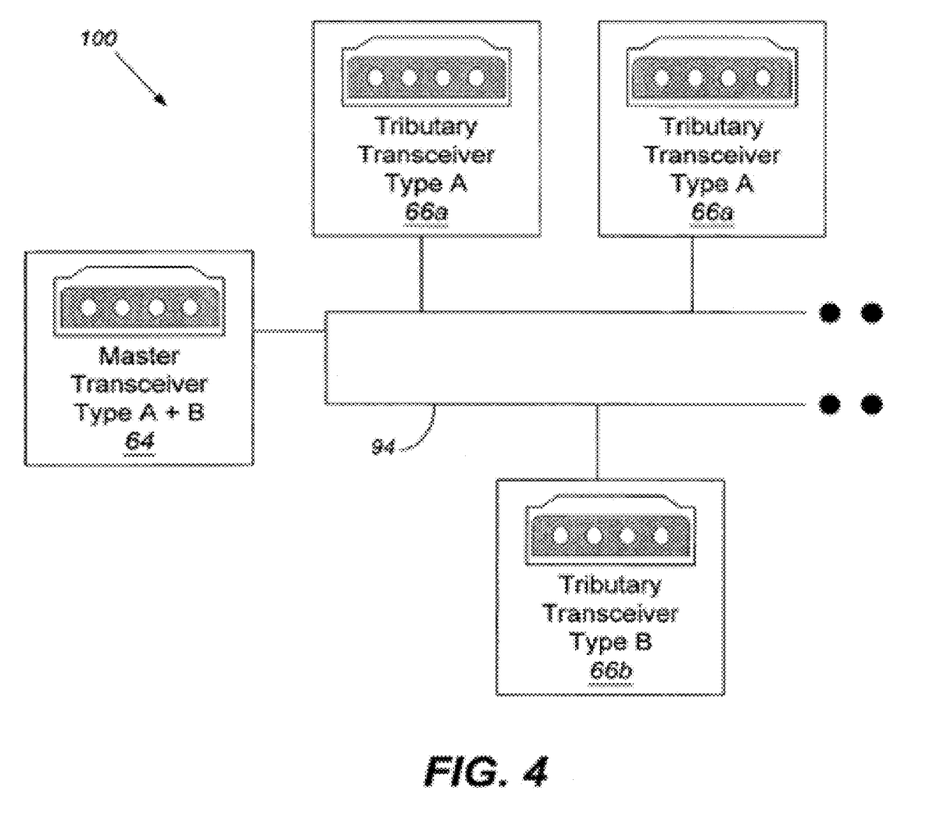
FIG. 4 is a block diagram of a multipoint communication system including the master transceiver and a plurality of tributary transceivers of the type illustrated in FIG. 3.

Referring now to FIG. 4, a multipoint communication system 100 is shown comprising a master transceiver 64 along with a plurality of tribs 66-66. In this example, two tribs 66a-66a run a type A modulation method while one trib 66b runs a type B modulation method. The present invention permits a secondary or embedded modulation method (e.g., type B) to replace the standard modulation method (e.g., type A) after an initial training sequence. This allows the master transceiver 64 to communicate seamlessly with tribs of varying types.

Figure 5:
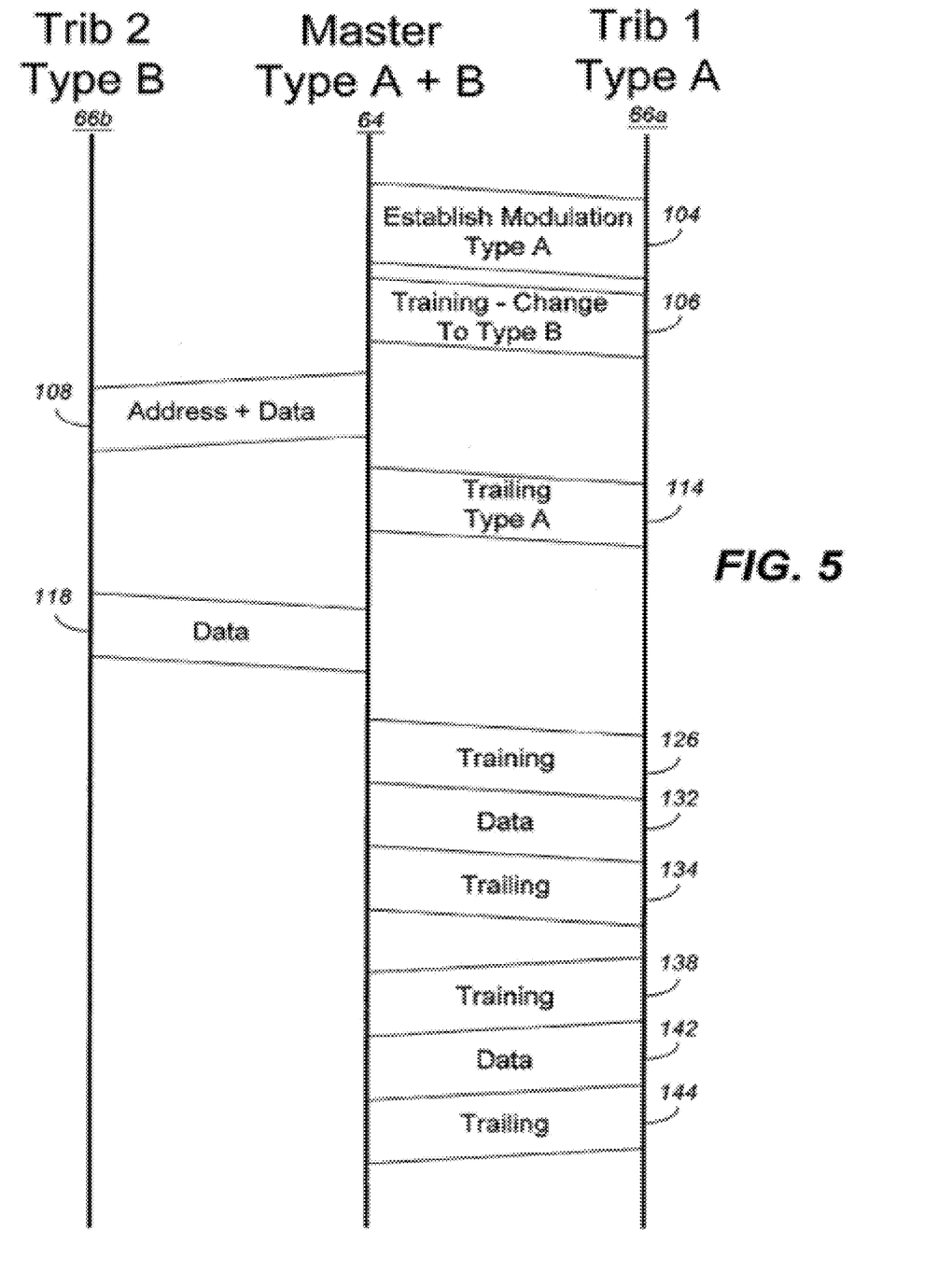
FIG. 5 is a ladder diagram illustrating the operation of the multipoint communication system of FIG. 4.
Figure 6:
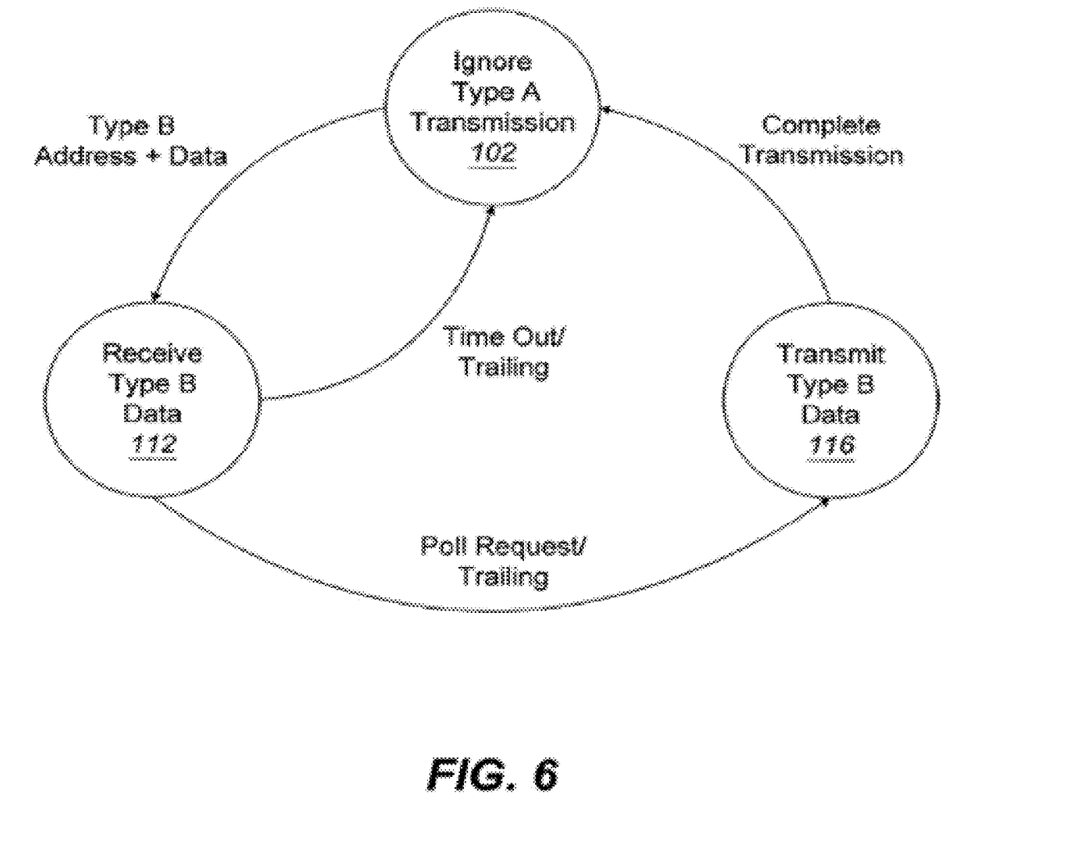
FIG. 6 is a state diagram for a tributary transceiver of FIGS. 3-5 using a secondary modulation method in accordance with the principles of the present invention.

The operation of multipoint communication system 100 will be described hereafter with reference to the ladder diagram of FIG. 5 and the state diagrams of FIGS. 6 and 7. A communication session between the master transceiver 64 and a type B trib 66b will be discussed first. A state diagram for a type B trib 66b is shown in FIG. 6. Type B trib 66b is initialized in state 102 in which type A modulation transmissions are ignored. In the present example, the primary modulation method is type A, thus, as shown in FIG. 5, master transceiver 64 establishes type A as the primary modulation in sequence 104. Note that because trib 66b responds only to type B modulation transmissions, only the type A tribs 66a-66a are receptive to transmission sequence 104.

To switch from type A modulation to type B modulation, master transceiver 64 transmits a training sequence 106 to type A tribs 66a in which these tribs are notified of an impending change to type B modulation. The switch to type B modulation could be limited according to a specific time interval or for the communication of a particular quantity of data. After notifying the type A tribs 66a of the change to type B modulation, master transceiver 64, using type B modulation, transmits data along with an address in sequence 108, which is destined for a particular type B trib 66b. The type B trib 66b targeted by the master transceiver 64 will transition to state 112 as shown in FIG. 6 upon detecting its own address where it processes the data transmitted in sequence 108.

After completing transmission sequence 108, master transceiver 64 transmits a trailing sequence 114 using type A modulation thus notifying all type A tribs 66a that type B modulation transmission is complete. If master transceiver 64 has not transmitted a poll request to the type B trib 66b in sequence 108, then the type B trib 66b that was in communication with the master transceiver 64 will return to state 102 after timing out based on the particular time interval defined for the type B modulation transmission or transfer of the particular quantity of data. Note that the trailing sequence 114 is ineffective in establishing the termination of a communication session between master transceiver 64 and a type B trib 66b because the trailing sequence is transmitted using type A modulation.

If, however, master transceiver 64 transmitted a poll request in sequence 108, then the type B trib 66b transitions to state 116 where it will transmit data, using type B modulation, to master transceiver 64 in sequence 118. After completion of this transmission, the type B trib 66b returns to state 102 where type A transmissions are ignored.

Figure 7:
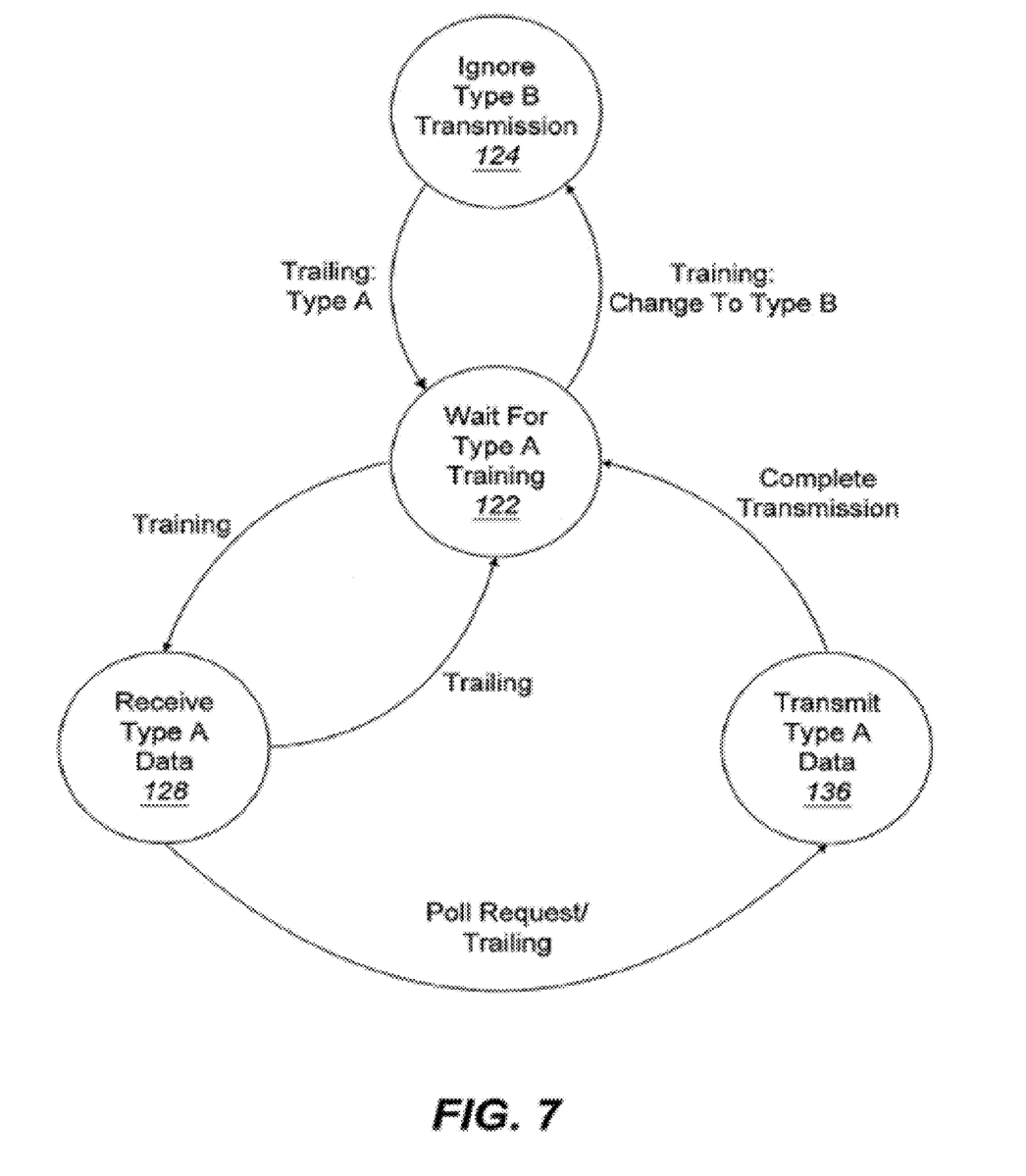
FIG. 7 is a state diagram for a tributary transceiver of FIGS. 3-5 using a primary modulation method in accordance with the principles of the present invention.

With reference to FIG. 5 and FIG. 7, a communication session between the master transceiver 64 and a type A trib 66a will now be discussed. A state diagram for a type A trib 66a is shown in FIG. 7. A type A trib 66a is initialized in state 122 in which it awaits a type A modulation training sequence. If, however, master transceiver transmits a training sequence in which the type A tribs 66a-66a are notified of a change to type B modulation as indicated by sequence 106, then a transition is made to state 124 where all type B transmissions are ignored until a type A modulation trailing sequence (e.g., sequence 114) is detected. Upon detecting the type A trailing sequence, a type A trib 66a returns to state 122 where it awaits a training sequence.

To initiate a communication session with a type A trib 66a, master transceiver 64 transmits a training sequence 126 in which an address of a particular type A trib 66a is identified. The identified type A trib 66a recognizes its own address and transitions to state 128 to receive data from master transceiver 64 as part of sequence 132.

After completing transmission sequence 132, master transceiver 64 transmits a trailing sequence 134 using type A modulation signifying the end of the current communication session. If master transceiver 64 has not transmitted a poll request to the type A trib 66a in sequence 132, then the type A trib 66a that was in communication with the master transceiver 64 will return to state 122 after receiving trailing sequence 134.

If, however, master transceiver 64 transmitted a poll request in sequence 132, then the type A trib 66a transitions to state 136 after receiving trailing sequence 134 where it will transmit training sequence 138, followed by data sequence 142, and terminated by trailing sequence 144 all using type A modulation. After completion of these transmissions, the type A trib 66*a* returns to state 122 to await the next type A modulation training sequence by master transceiver 64.

The control programs 78 and 92 of the present invention can be implemented in hardware, software, firmware, or a combination thereof. In the preferred embodiment(s), the control programs 78 and 92 are implemented in software or firmware that is stored in a memory and that is executed by a suitable instruction execution system.

The control programs 78 and 92, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims. Further, in the claims hereafter, the corresponding structures, materials, acts, and equivalents of all means or step plus function elements are intended to include any structure, material, or acts for performing the functions with other claimed elements as specifically claimed.

What is claimed:

1. A communication device capable of communicating according to a master/slave relationship in which a slave communication from a slave to a master occurs in response to a master communication from the master to the slave, the device comprising:

a transceiver, in the role of the master according to the master/slave relationship, for sending at least transmissions modulated using at least two types of modulation methods, wherein the at least two types of modulation methods comprise a first modulation method and a second modulation method, wherein the second modulation method is of a different type than the first modulation method, wherein each transmission comprises a group of transmission sequences, wherein each group of transmission sequences is structured with at least a first portion and a payload portion wherein first information in the first portion indicates at least which of the first modulation method and the second modulation method is used for modulating second information in the payload portion, wherein at least one group of transmission sequences is addressed for an intended destination of the payload portion, and wherein for the at least one group of transmission sequences:

the first information for said at least one group of transmission sequences comprises a first sequence, in the first portion and modulated according to the first modulation method, wherein the first sequence indicates an impending change from the first modulation method to the second modulation method, and the second information for said at least one group of transmission sequences comprises a second sequence that is modulated according to the second modulation method, wherein the second sequence is transmitted after the first sequence.

2. The device of claim 1, wherein the transceiver is configured to transmit a third sequence after the second sequence, wherein the third sequence is transmitted in the first modulation method and indicates that communication from the master to the slave has reverted to the first modulation method.

3. The device of claim 1, wherein the transceiver is configured to transmit the second sequence according to a specific time interval.

4. The device of claim 1, wherein the transceiver is configured to transmit the second sequence according to a particular quantity of data.

5. The device of claim 1, further comprising a processor and a memory, wherein the memory has stored therein instructions that when executed by the processor cause the transceiver to transmit the first sequence and the second sequence.

6. The device of claim 5, wherein the memory comprises an erasable programmable read-only memory.

7. The device of claim 5, wherein the memory has stored therein program code for the first modulation method and the second modulation method.

8. The device of claim 5, wherein the memory comprises random access memory.

9. The device of claim 5, wherein the memory comprises read-only memory.

10. The device of claim 5, wherein the memory has stored therein program code for operating the transceiver in a multipoint master/slave relationship.

11. The device of claim 1, wherein the first communication from the master to the slave is a poll in accordance with a multipoint communications relationship, wherein the poll indicates that the master has selected the slave for transmission.

12. The device of claim 1, wherein the transceiver is configured to be the master.

13. The device of claim 1, wherein the first information in the first portion indicates the first modulation method when the intended destination is a first type of receiver and indicates the second modulation when the intended destination is a second type of receiver.

14. The device of claim 13, wherein the second type of receiver differs from the first type of receiver at least by the second type of receiver being designated for transmitting in the second modulation method.

15. The device of claim 13, wherein the second type of receiver differs from the first type of receiver at least by the second type of receiver being operable to ignore transmissions intended for the first type of receiver.

16. The device of claim 15, wherein the intended destination ignores transmissions in the second modulation when the intended destination is the first type of receiver.

17. The device of claim 15, wherein the intended destination ignores transmissions in the first modulation when the intended destination is the second type of receiver.

18. The device of claim 15, wherein the intended destination is the first type of receiver and unable to demodulate the second modulation method.

19. The device of claim 13, wherein the transceiver is configured to receive data from the intended destination in the first modulation method when the intended destination is the first type of receiver.

20. The device a claim 13, wherein the transceiver is configured to receive data from the intended destination in the second modulation method then the intended destination is the second type of receiver.

21. The device of claim 1, the transceiver is configured to transmit a third sequence, according to the first modulation method, at a time after the second sequence is transmitted.

22. The device of claim 1, wherein the transceiver transmits data modulated according to either the first modulation method or the second modulation method at any given point in time when the transceiver is transmitting.

23. A communications device, comprising:
a processor; and
a memory having stored therein executable instructions for execution by the processor, wherein the executable instructions direct transmission of a first data with a first modulation method followed by a second data with a second modulation method, wherein the first modulation method is different than the second modulation method, wherein the first data comprises an indication of an impending change from the first modulation method to the second modulation method, wherein the executable instructions direct transmission of a third data with the first modulation method after the second data, and wherein the third data indicates that communication has reverted to the first modulation method.

24. The device of claim 23, wherein transmission of the second data is according to a specific time interval.

25. The device of claim 23, further comprising a transmitter configured to transmit the first data and the second data.

26. The device of claim 23, wherein the memory has stored therein program code for the first modulation method and the second modulation method.

27. The device of claim 23, wherein the memory comprises random access memory.

28. The device of claim 23, wherein the memory comprises read-only memory.

29. The device of claim 23, wherein the memory has stored therein program code for a multipoint communications protocol.

30. The device of claim 23, wherein transmission of the second data is according to a particular quantity of data.

31. The device of claim 23, wherein the memory comprises an erasable programmable read-only memory.

32. A communications device, comprising:
a processor; and
a memory having stored therein executable instructions for execution by the processor, wherein the executable instructions direct transmission of a first data with a first modulation method followed by a second data with a second modulation method, wherein the first modulation method is different than the second modulation method, wherein the first data comprises an indication of an impending change from the first modulation method to the second modulation method wherein the executable instructions direct transmission of a third data with the first modulation method after the second data, and wherein transmission of the second data is according to a particular quantity of data.

33. The device of claim 32, wherein transmission of the second data is according to a specific time interval.

34. The device of claim 32, further comprising a transmitter configured to transmit the first data and the second data.

35. The device of claim 32, wherein the memory has stored therein program code for the first modulation method and the second modulation method.

36. The device of claim 32, wherein the memory comprises random access memory.

37. The device of claim 32, wherein the memory comprises read-only memory.

38. The device of claim 32, wherein the memory has stored therein program code for a multipoint communications protocol.

39. The device of claim 32, wherein the memory comprises an . erasable programmable read-only memory.

40. A device that transmits in accordance with a first modulation method and a second modulation method that is different than the first modulation method, said device comprising;
at least one modulator;
a transceiver that includes the at least one modulator, wherein the transceiver is configured to transmit:
a first sequence, modulated in accordance with the first modulation method, that indicates an impending change from the first modulation method to the second modulation method, and
a second sequence, in accordance with the second modulation method, that is transmitted at a time after the first sequence.

41. The device of claim 40, wherein the transceiver is configured to transmit a third sequence after the second sequence, wherein the third sequence is transmitted in accordance with the first modulation method and indicates that a subsequent communication has reverted to the first modulation method.

42. The device of claim 40, wherein the transceiver is configured to transmit the second sequence according to a specific time interval.

43. The device of claim 40, wherein the transceiver is configured to transmit the second sequence according to a particular quantity of data.

44. The device of claim 40, further comprising a processor and a memory, wherein the memory has stored therein instructions that when executed by the processor cause the transmitter to transmit this first sequence and the second sequence.

45. The device of claim 44, wherein the memory comprises random access memory.

46. The device of claim 44, wherein the memory comprises read-only memory.

47. The device of claim 44, wherein the memory has stored therein program code for a multipoint communications protocol.

48. The device of claim 44, wherein the memory comprises an erasable programmable read-only memory.

49. A computer-readable storage medium having computer executable instructions stored therein that when executed by a processor control a master transceiver, said computer executable instructions, comprising:

first logic configured to transmit first information in a first modulation method for communication;

second logic configured to transmit a first sequence to notify of a change from said first modulation method to a second modulation method;

third logic configured to transmit second information in said second modulation method; and fourth logic configured to transmit a second sequence after the second information is transmitted, wherein the second sequence is transmitted in the first modulation method and indicates that communication has reverted to the first modulation method.

50. The computer-readable storage medium of claim 49, wherein the first transceiver is configured to transmit the second sequence according to a specific time interval.

51. The computer-readable storage medium of claim 49, further comprising program code for the first modulation method and the second modulation method.

52. The computer-readable storage medium of claim 49, further comprising program code for a multipoint communications protocol.

53. The computer-readable storage medium of claim 49, wherein the first transceiver is configured to transmit the second sequence according to a particular quantity of data.

54. A computer-readable storage medium having computer executable instructions stored therein that when executed by a processor control a master transceiver, said computer executable instructions, comprising:

first logic configured to transmit first information in a first modulation method for communication;

second logic configured to transmit a first sequence to notify of a change from said first modulation method to a second modulation method;

third logic configured to transmit second information in said second modulation method; and fourth logic configured to transmit a second sequence after the second information is transmitted, wherein the fourth logic is configured to transmit the second sequence according to a particular quantity of data.

55. The computer-readable storage medium of claim 54, wherein the first transceiver is configured to transmit the second sequence according to a specific time interval.

56. The computer-readable storage medium of claim 54, further comprising program code for the first modulation method and the second modulation method.

57. The computer-readable storage medium of claim 54, further comprising program code for a multipoint communications protocol.

58. A communication device capable of communicating according to a master/slave relationship in which a slave message from a slave to a master occurs in response to a master message from the master to the slave, the device comprising:

a transceiver, in the role of the master according to the master/slave relationship, capable of transmitting using at least two types of modulation methods, wherein the at least two types of modulation methods comprise a first modulation method and a second modulation method, wherein the second modulation method is of a different type than the first modulation method, and wherein the transceiver is configured to transmit messages with:

a first sequence, in the first modulation method, that indicates at least which of the first modulation method and the second modulation method is used for modulating a second sequence, wherein, in at least one message, the first sequence indicates an impending change from the first modulation method to the second modulation method, and wherein the at least one message is addressed for an intended destination of the second sequence, and the second sequence, modulated in accordance with the modulation method indicated by the first sequence and, in the at least one message, modulated using the second modulation method, wherein the second sequence is transmitted after the first sequence.

59. The device of claim 58, wherein the transceiver is configured to transmit a third sequence after the second sequence, wherein the third sequence is transmitted in the first modulation method and indicates that communication from the master to the slave has reverted to the first modulation method.

60. The device of claim 58, wherein the transceiver is configured to transmit the second sequence according to a specific time interval.

61. The device of claim 58, wherein the transceiver is configured to transmit the second sequence according to a particular quantity of data.

62. The device of claim 58, further comprising a processor and a memory, wherein the memory has stored therein instructions that when executed by the processor cause the transceiver to transmit the first sequence and the second sequence.

63. The device of claim 62, wherein the memory has stored therein program code for the first modulation method and the second modulation method.

64. The device of claim 62, wherein the memory comprises random access memory.

65. The device of claim 62, wherein the memory comprises read-only memory.

66. The device of claim 62, wherein the memory has stored therein program code for operating the transceiver in a multipoint master/slave relationship.

67. The device of claim 62, wherein the memory comprises an erasable programmable read-only memory.

68. The device of claim 58, wherein the first communication from the master to the slave is a poll in accordance with a multipoint communications relationship, wherein the poll indicates that the master has selected the slave for transmission.

69. The device of claim 58, wherein the transceiver is configured to be the master.

70. The device of claim 58, wherein the first information in the first portion indicates the first modulation method when the intended destination is a first type of receiver and indicates the second modulation when the intended destination is a second type of receiver.

71. The device of claim 70, wherein the second type of receiver differs from the first type of receiver at least by the second type of receiver being designated for transmitting in the second modulation method.

72. The device of claim 70, wherein the second type of receiver differs from the first type of receiver at least by the second type of receiver being operable to ignore transmissions intended for the first type of receiver.

73. The device of claim 72, wherein the intended destination ignores transmissions in the second modulation when the intended destination is the first of receiver.

74. The device of claim 72, wherein the intended destination ignores transmissions in the first modulation when the intended destination is the second type of receiver.

75. The device of claim 72, wherein the intended destination is the first type of receiver and unable to demodulate the second modulation method.

76. The device of claim 70, wherein the transceiver is configured to receive data from the intended destination in the first modulation method when the intended destination is the first type of receiver.

77. The device of claim 70, wherein the transceiver is configured to receive data from the intended destination in the second modulation method when the intended destination is the second type of receiver.

78. The device of claim 58, the transceiver is configured to transmit a third sequence, according to the first modulation method, at a time after the second sequence is transmitted.

79. The device of claim 58, wherein the transceiver transmits data modulated according to either the first modulation method or the second modulation method at any given point in time when the transceiver is transmitting.

* * * * *